United States Patent
Binek et al.

(10) Patent No.: US 11,543,127 B2
(45) Date of Patent: Jan. 3, 2023

(54) GAS TURBINE ENGINE DILUTION CHUTE GEOMETRY

(71) Applicant: Raytheon Technologies Corporation, Farmington, CT (US)

(72) Inventors: Lawrence A. Binek, Glastonbury, CT (US); Brendan T. Gustafson, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 20 days.

(21) Appl. No.: 16/791,499

(22) Filed: Feb. 14, 2020

(65) Prior Publication Data

US 2021/0254831 A1    Aug. 19, 2021

(51) Int. Cl.
*F23R 3/06*     (2006.01)
*F23R 3/00*     (2006.01)
*B33Y 80/00*   (2015.01)

(52) U.S. Cl.
CPC .......... *F23R 3/002* (2013.01); *F23R 3/06* (2013.01); *B33Y 80/00* (2014.12); *F05D 2240/35* (2013.01); *F05D 2250/182* (2013.01)

(58) Field of Classification Search
CPC .... F23R 3/002; F23R 3/06; F23R 3/32; F23R 3/34; B33Y 80/00; F05D 2240/35; F05D 2250/182
See application file for complete search history.

(56) References Cited

U.S. PATENT DOCUMENTS

| | | | | |
|---|---|---|---|---|
| 5,749,219 A * | 5/1998 | DuBell | ...................... | F02C 7/26 60/733 |
| 6,931,862 B2 | 8/2005 | Harris | | |
| 8,695,349 B2 * | 4/2014 | Toon | ....................... | F23D 11/38 60/740 |
| 9,551,490 B2 * | 1/2017 | DiCintio | ................. | F23R 3/283 |
| 9,803,498 B2 | 10/2017 | Jewess et al. | | |
| 10,816,203 B2 * | 10/2020 | Jones | ....................... | F23R 3/045 |
| 2006/0021350 A1 * | 2/2006 | Sanders | ................... | F23R 3/286 60/743 |
| 2015/0285504 A1 | 10/2015 | Melton | | |
| 2017/0059159 A1 * | 3/2017 | Varney | .................... | C04B 35/71 |
| 2017/0370585 A1 | 12/2017 | Boardman et al. | | |
| 2019/0178497 A1 | 6/2019 | Jones et al. | | |

FOREIGN PATENT DOCUMENTS

| | | | |
|---|---|---|---|
| EP | 2639508 A2 | 9/2013 | |
| EP | 3249301 A1 | 11/2017 | |
| WO | 2016057009 A1 | 4/2016 | |
| WO | WO2016057007 A1 | 4/2016 | |
| WO | WO2018063151 A1 | 4/2018 | |

OTHER PUBLICATIONS

Extended European Search Report for EP Application No. 21156869.6, dated Jul. 8, 2021, 8 pages.

* cited by examiner

*Primary Examiner* — Steven M Sutherland
(74) *Attorney, Agent, or Firm* — Getz Balich LLC

(57) ABSTRACT

A combustor for a gas turbine engine includes a combustor liner and a dilution chute integral and conformal with the combustor liner to provide an outlet into the combustor for fuel, wherein the dilution chute has at least one wall with a tapered edge extending into an interior of the combustor.

19 Claims, 4 Drawing Sheets

GAS TURBINE ENGINE DILUTION CHUTE GEOMETRY

BACKGROUND

The present disclosure relates generally to gas turbine engines. More specifically, this disclosure relates to dilution chute geometry of a gas turbine engine.

Some aircraft can include, for example, Unpiloted (or Unmanned) Aerial Vehicles (UAVs) and expendable turbojet systems for guided munitions, missiles, and decoys. These attritable aircraft are generally designed as limited lifetime vehicles, with expected lifetimes as short as a single use or single mission vehicle. As such, many components and features common in traditional piloted aircraft are unnecessary or can be simplified for attritable aircraft applications, including combustor systems.

Conventional combustor systems including dilution chutes in aircraft, both of the attritable and non-attritable type, can have many individual parts, each requiring assembly, which can be expensive and time consuming. Furthermore, cross drilling through the engine support structures has conventionally been used in order to create necessary fluid passageways, which adds additional labor and expense to the manufacturing process.

Proper combustion efficiency is essential for a gas turbine engine. Improper combustion efficiency can lead to the engine running too rich or too lean. On the one hand, a gas turbine engine running too rich can result in an engine producing low power due to incomplete combustion of the fuel, producing an engine surge or stall condition, and/or producing excessive carbon build up in the combustor. On the other hand, a gas turbine running too lean can lead to engine blow out due to insufficient fuel to sustain combustion.

SUMMARY

A combustor for a gas turbine engine includes a combustor liner and a dilution chute integral and conformal with the combustor liner to provide an outlet into the combustor for fuel, wherein the dilution chute has at least one wall with a tapered edge extending into an interior of the combustor.

A method of manufacturing a combustor with an integral and conformal dilution chute having a tapered edge including additively manufacturing a combustor liner and additively manufacturing an integral and conformal dilution chute having a tapered edge with the combustor liner to provide an outlet into the combustor for fuel.

DETAILED DESCRIPTION

A gas turbine engine with an integrally built dilution chute simplifies manufacturing. A gas turbine engine can leverage additive manufacturing techniques to improve various aspects of the gas turbine engine. For example, additive manufacturing allows assembly details to be unitized, and simultaneously permits integration of many complex performance-enhancing features. The additive manufacture of the engine reduces the time to delivery to the customer and lowers the overall production costs of the unit.

Disclosed herein is a combustor with an integrally and conformally built dilution chute with tapered edges to reduce carbon build up on the dilution chute in the combustor of a gas turbine engine. In contrast, a combustor with a dilution chute without tapered edges builds up carbon deposits on the dilution chute compared to a dilution chute with tapered edges in a combustor. Carbon build up can interfere with the air flow in the combustor reducing the combustion efficiency even more. Furthermore, localized carbon build up can result in the carbon deposits breaking free and damaging engine components downstream of the combustor.

Figure 1:
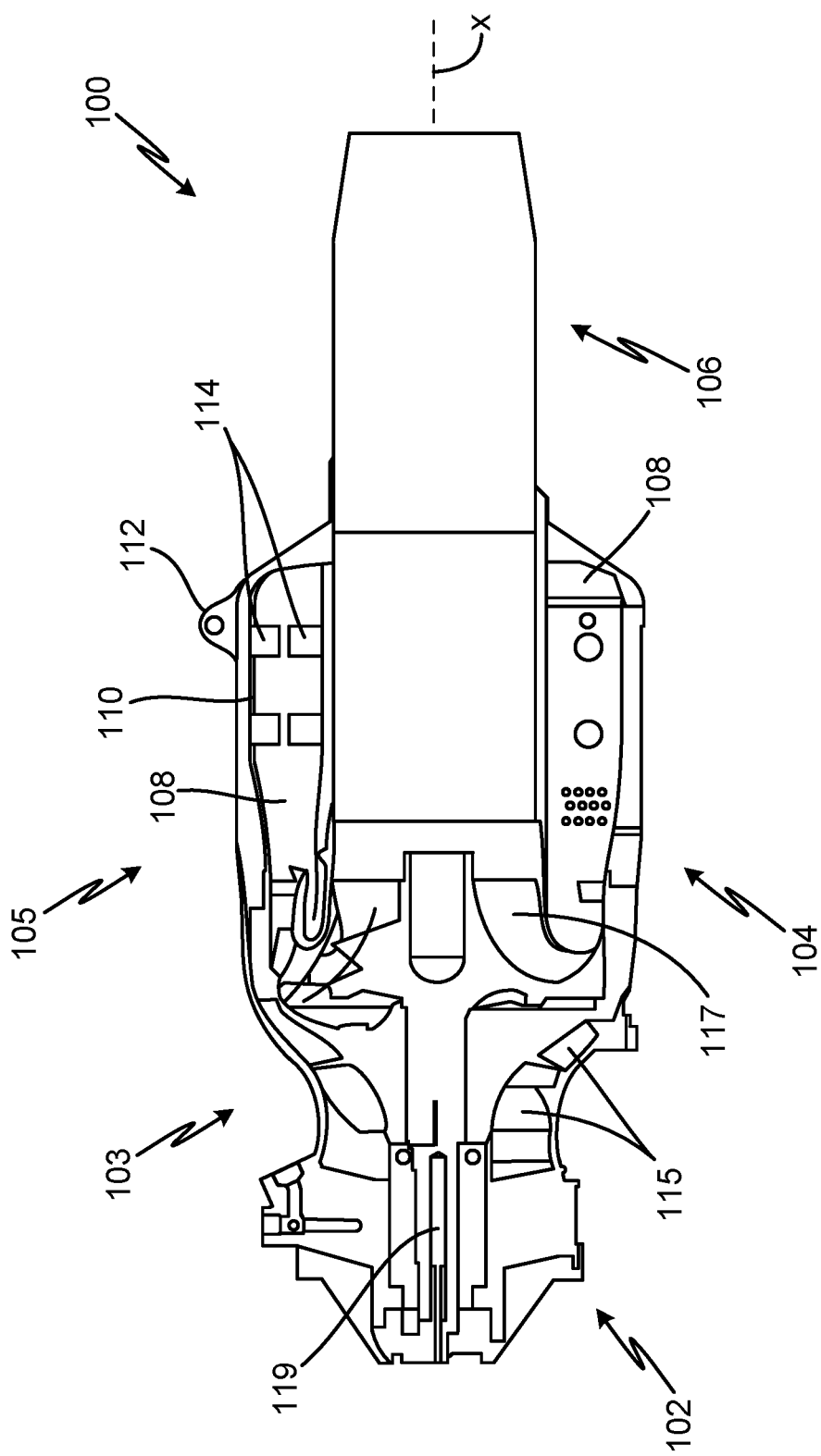
FIG. 1 is a cross-sectional view of a gas turbine engine.

FIG. 1 is a cross-sectional view of a gas turbine engine. FIG. 1 shows gas turbine engine 100 including forward engine casing 102, compressor section 103, rearward engine casing 104, turbine section 105, exhaust casing 106, combustor 108, combustor liner 110, fuel rail 112, dilution chutes 114, compressor blades 115, turbine blades 117, rotor 119, and rotational axis X. Forward engine casing 102 encases a compressor section of gas turbine engine 100 and is connected to rearward engine casing 104, which encases combustion and turbine sections of gas turbine engine 100. Exhaust casing 106 is connected to rearward engine casing 104, opposing forward engine casing 102.

Rearward engine casing 104 includes at least one combustor 108 with combustor liner 110, fuel rail 112, and dilution chutes 114. Fuel rail 112 circumferentially surrounds rearward engine casing 104 and receives fuel from a fuel source such as a fuel tank. Fuel rail 112 delivers fuel to each combustor 108 through dilution chute 114, which is formed integral and conformal with combustor liner 110. Although two combustors 108 are depicted in FIG. 1, gas turbine engine 100 can include a single combustor or can include more than two combustors arranged circumferentially around rotational axis X.

Operationally, air enters the forward end of a compressor section 103 encased by forward engine casing 102 and is compressed by compressor blades 115. Compressed air along with fuel enters combustor 108 through dilution chutes 114 where the compressed air and fuel are combusted. The combusted fuel and compressed air from combustor 108 enter a turbine section 105 encased by rearward engine casing 104 and turns turbine blades 117 circumferentially around rotational axis X, which generates power by also turning rotor 119 connected to compressor blades 115. The air exits out of the aft end of exhaust casing 106.

Figure 2:
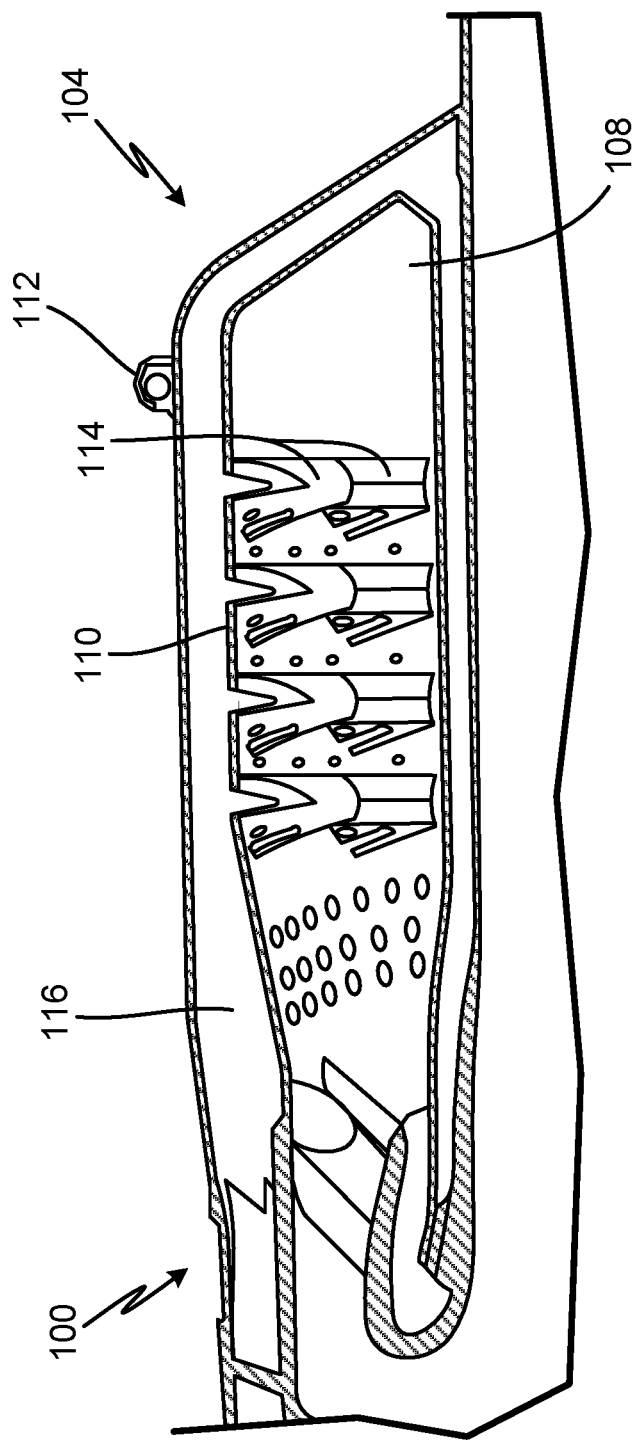
FIG. 2 is a sectional view from FIG. 1 showing a combustor.

FIG. 2 is a sectional view from FIG. 1 showing a combustor. FIG. 2 shows gas turbine engine 100 including rearward engine casing 104, at least one combustor 108, combustor liner 110, fuel rail 112, dilution chutes 114, and compressed air channel 116. Rearward engine casing 104 includes combustor 108 with combustor liner 110, fuel rail 112, and dilution chutes 114. Fuel rail 110 circumferentially surrounds rearward engine casing 104 and receives fuel from a fuel source such as a fuel tank. Fuel rail 112 delivers fuel to each combustor 108 through dilution chute 114, which is formed integral and conformal with combustor liner 110 and provides a wetting surface for the fuel entering dilution chute 114. In the context of this application, integral means "formed as a unitary part" and conformal means "substantially following the geometry of."

Compressed air channel 116 surrounds combustor 108. Compressed air is received from the compressor section 103 (shown in FIG. 1) and enters combustor 108 through a series of dilution holes and dilution chutes 114. In one embodiment, combustor 108 includes more than one dilution chute as shown in FIGS. 1 and 2. The combustor may include more than one type of dilution chute. For example, the combustor may include primary dilution chutes for allowing atomized fuel and air to enter the combustor and the combustor may also include secondary dilution chutes for allowing additional air to enter the combustor. In the illustrated embodiments in FIGS. 1 and 2, each combustor 108 in gas turbine engine 100 includes twelve primary and twelve secondary dilution chutes with each set being circumferentially arranged around combustor liner 110. The placement, number, and orientation of the dilution chutes can be optimized for fuel efficiency. Factors which may influence fuel efficiency parameters are, for example, engine size, engine load and/or demand requirements, materials used in the build process, and engine cooling requirements. In other embodiments, a fewer or greater number of primary or secondary dilution chutes are integral and conformal with combustor liner 110.

Figure 3:
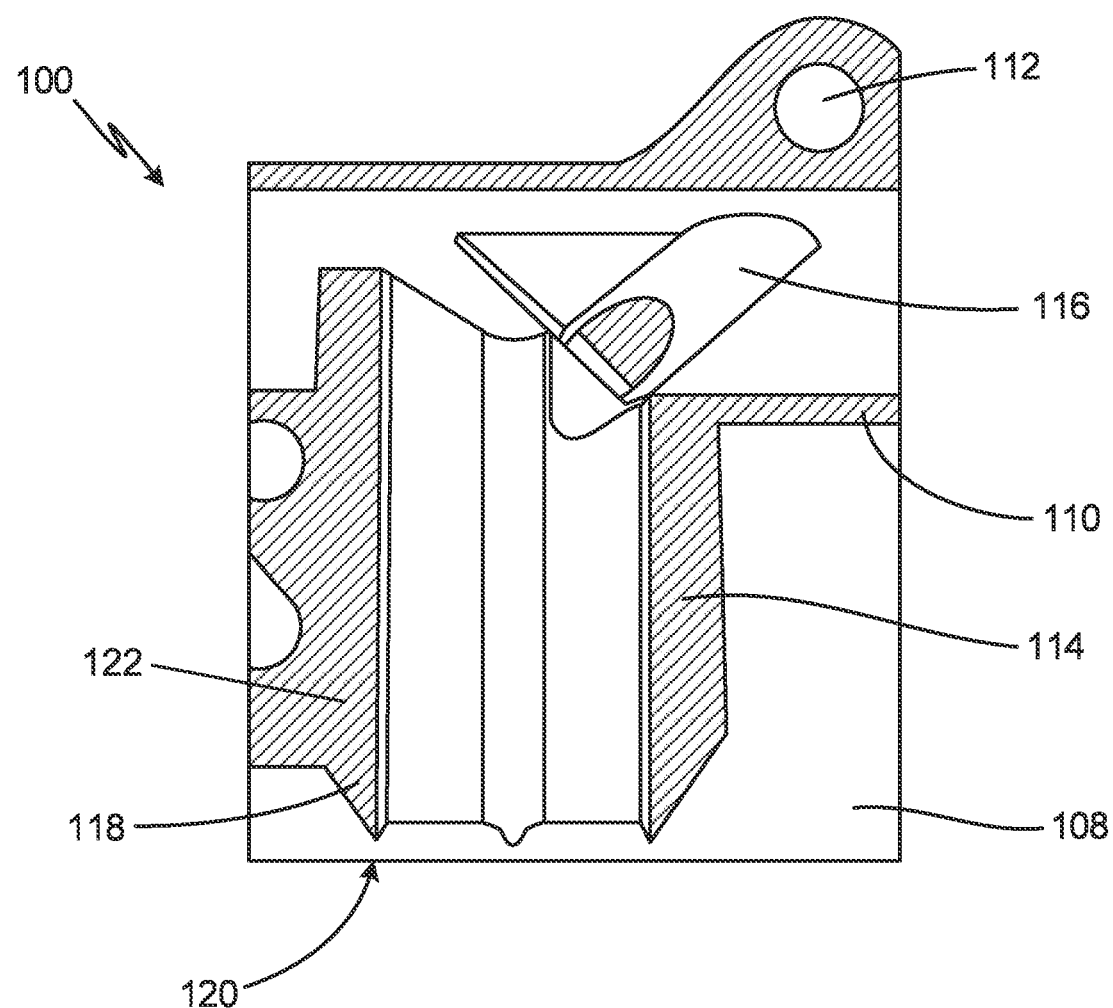
FIG. 3 is a cross-sectional view of a dilution chute within a combustor.

FIG. 3 is a cross-sectional view of a dilution chute within a combustor. FIG. 3 shows gas turbine engine 100 including combustor 108, combustor liner 110, fuel rail 112, dilution chute 114, fuel line 116, tapered edge 118, vertex 120, and walls 122. Combustor 108 includes dilution chute 114 formed integral and conformal with combustor liner 110. Fuel rail 112 circumferentially surrounds rearward engine casing 104 (shown in FIGS. 1 and 2) and receives fuel from a fuel source such as a fuel tank. Fuel line 116 receives fuel from fuel rail 112 and delivers fuel to dilution chute 114, which provides a wetting surface for fuel exiting fuel line 116.

Dilution chute 114 includes tapered edge 118 and vertex 120 extending from walls 122. Tapered edge 118 can have a substantially 45° angle of inclination measured from vertex 120. Tapered edge 118 can have an angle of inclination of more than 45°. Walls 122 extend radially away from combustor liner 110 into interior of combustor 108 terminating at tapered edge 118 and vertex 120. In one embodiment, all walls 122 of dilution chute 114 have tapered edges 118. In one embodiment, a subset of walls 122 of dilution chute 114 has tapered edge 118. In some embodiments, tapered edge 118 can be referred to as having a knife edge shape.

Gas turbine engine 100 including combustor 108, combustor liner 110, fuel rail 112, dilution chutes 114, fuel line 116, tapered edge 118, vertex 120, and walls 122 can be additively manufactured using any metal or alloy that can tolerate the high temperature and pressure environment of a gas turbine engine for the expected useable life of the vehicle, such as, for example, Inconel® 625 or other nickel alloys including alloys of nickel, chromium, and iron. However, guided munitions, missiles, and decoys are designed as single use vehicles and can have a maximum useable life of 10 hours. Heat protection that extends the useable life of the vehicle beyond 10 hours can unnecessarily add labor and expense to the manufacturing of such an engine. On the other hand, some UAVs can be designed to perform multiple missions and more heat protection may be desirable. A specific metal or alloy with or without additional treatments to provide heat protection can be chosen with such considerations in mind. For example, a thermal barrier layer or coating can be applied to the metal or alloy to extend the useful life of the gas turbine engine.

Figure 4A:
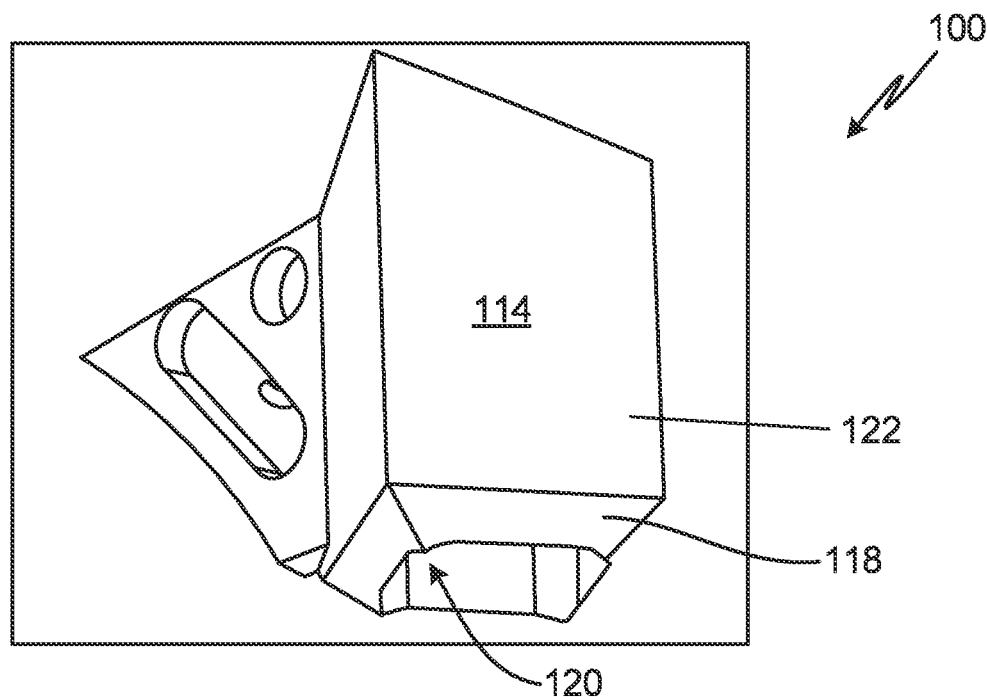
FIG. 4A is a perspective view of one embodiment of a dilution chute.

FIG. 4A is a perspective view of one embodiment of a dilution chute. FIG. 4A shows gas turbine engine 100 including dilution chute 114, tapered edge 118, vertex 120, and walls 122. Dilution chute 114 includes tapered edge 118 and vertex 120 extending from walls 122. Walls 122 extend radially away from the combustor liner into the interior of the combustor. Although dilution chute 114, depicted in FIG. 4A, has four walls 122 with knife edge shaped tapered edges 118 and has a substantially square shape opening, dilution chute 114 can have any number of walls 122 or opening shape. For example, dilution chute 114 can have a circular, oval, triangular, rhomboid, rectangular, pentagonal, or hexagonal opening shape with a corresponding number of walls 122. For example, a circular or oval shaped opening has one wall; a triangular shaped opening has 3 walls; a rhomboid or rectangular shaped opening has 4 walls; a pentagonal shaped opening has 5 walls; and a hexagonal shaped opening has 6 walls.

Figure 4B:
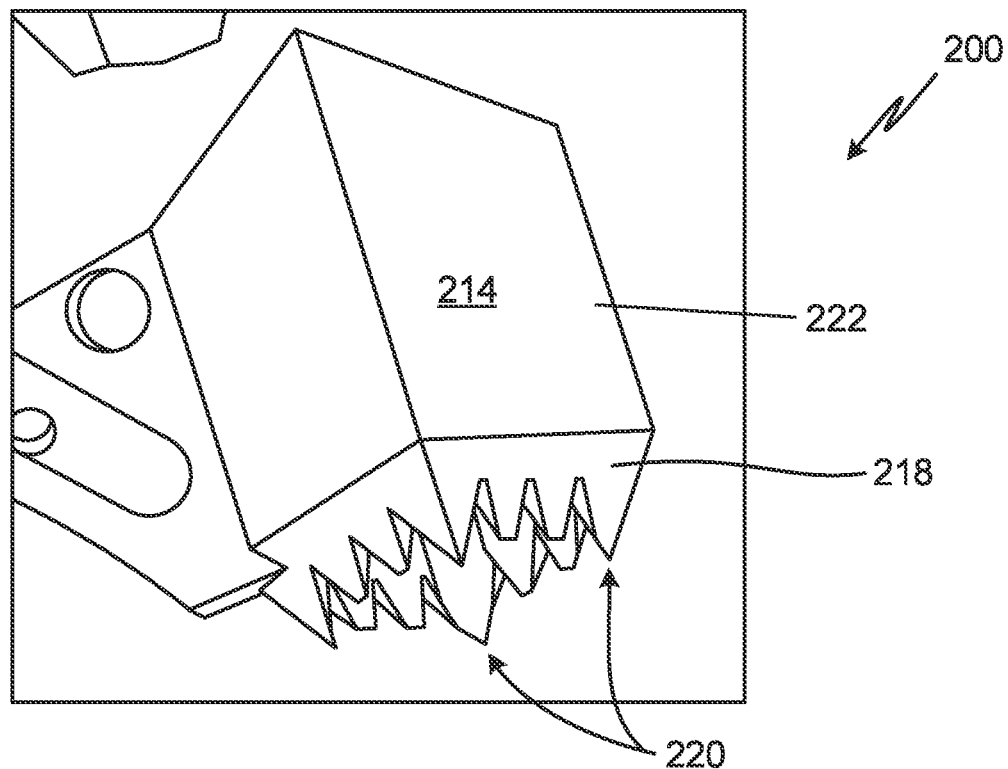
FIG. 4B is a perspective view of another embodiment of a dilution chute.

FIG. 4B is a perspective view of another embodiment of a dilution chute. FIG. 4B shows gas turbine engine 200 including dilution chute 214, tapered edge 218, vertices 220, and walls 222. Dilution chute 214 includes tapered edge 218 and vertex 220 extending from walls 222. Walls 222 extend radially away from the combustor liner into the interior of the combustor and terminate at tapered edge 218 and vertices 220. As depicted in FIG. 4B, tapered edge 218 has a castellation shape. In other words, each tapered edge along each wall has a series of undulating plateaus and valleys with each plateau having a knife edge shape. As depicted in FIG. 4B, the intersection of any two walls 222 has vertex 220 with a peak shape.

In one embodiment, each tapered edge has a saw tooth shape. In other words, each tapered edge along each wall has a series of undulating peaks and valleys with each peak defining a vertex. In other embodiments, the tapered edge can have peaks, plateaus, and valleys in alternating, segregated, or partially segregated orientations relative to one another. Considerations such as, for example, reducing carbon build up on the dilution chute, combustion efficiency, cooling effects, additive manufacturing process controls, and robustness of the build can be used to determine the size, number, and orientation of the tapered edge features (i.e., knife edge shapes, castellation shapes, and saw tooth shapes defined by the peaks, plateaus, and valleys).

A combustor with a dilution chute without tapered edges builds up carbon deposits on the dilution chute more readily compared to a dilution chute with tapered edges in a combustor. Notably, carbon deposits can alter the air flow characteristics in the combustor, reducing the combustion efficiency even more. Furthermore, carbon deposits can result in flaking, peeling, or breaking-off of the carbon deposits during engine operation. Large carbon deposits may damage internal downstream components as the carbon deposits travel through the engine.

Using additive manufacturing techniques such as, for example, laser powder bed fusion, electron beam melting, and glue binder jetting, a gas turbine engine can be built with an integral and conformable dilution chute with tapered edges as disclosed in the present application, which simplifies the manufacturing and assembly process, lowering overall production costs. The dilution chute with tapered edges disclosed in the present application reduces the amount of carbon deposition on the dilution chute during engine operation compared to an experimental gas turbine engine without a dilution chute without tapered edges.

DISCUSSION OF POSSIBLE EMBODIMENTS

The following are non-exclusive descriptions of possible embodiments of the present invention.

A combustor for a gas turbine engine includes a combustor liner and a dilution chute integral and conformal with the combustor liner to provide an outlet into the combustor for fuel, wherein the dilution chute has at least one wall with a tapered edge extending into an interior of the combustor.

The combustor of the preceding paragraph can optionally include, additionally and/or alternatively, any one or more of the following features, configurations and/or additional components:

The dilution chute has four walls and a substantially square shaped opening.

The tapered edge has a knife edge shape.

The tapered edge has a castellation shaped edge.

The tapered edge has a saw tooth shaped edge.

The tapered edge has an angle of inclination of substantially 45 degrees.

The tapered edge reduces carbon deposit formation on an exterior surface of the dilution chute compared to a dilution chute without a tapered edge.

A method of manufacturing a combustor with an integral and conformal dilution chute having a tapered edge including additively manufacturing a combustor liner and additively manufacturing an integral and conformal dilution chute having a tapered edge with the combustor liner to provide an outlet into the combustor for fuel.

The method of the preceding paragraph can optionally include, additionally and/or alternatively, any one or more of the following features, configurations and/or additional components:

The tapered edge has a knife edge shape.

The tapered edge has a castellation shaped edge.

The tapered edge has a saw tooth shaped edge.

The tapered edge has an angle of inclination of substantially 45 degrees.

The tapered edge reduces carbon deposit formation on an exterior surface of the dilution chute compared to a dilution chute without a tapered edge.

A gas turbine engine includes a compressor section and a combustor section in fluid communication with the compressor section. The combustion section includes a combustor liner and a dilution chute integral and conformal with the combustor liner to provide an outlet into the combustor for fuel and the dilution chute has a tapered edge extending into the combustor and the tapered edge reduces carbon buildup on an exterior surface of the dilution chute compared to a dilution chute without a tapered edge. The gas turbine engine includes a turbine section in fluid communication with the combustor section and an exhaust section in fluid communication with the turbine section.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A combustor for a gas turbine engine, the combustor comprising:
   a combustor liner; and
   a dilution chute integral and conformal with the combustor liner to provide an outlet into the combustor for fuel, the dilution chute including a plurality of walls;
   the plurality of walls extending longitudinally along a longitudinal centerline of the dilution chute into an interior of the combustor, the plurality of walls terminating at a tapered edge with a vertex, and the plurality of walls including a first wall and a second wall; and
   the tapered edge comprising a longitudinal peak at a corner between the first wall and the second wall.

2. The combustor of claim 1, wherein the dilution chute has four walls and a substantially square shaped opening.

3. The combustor of claim 1, wherein the tapered edge has a knife edge shape.

4. The combustor of claim 1, wherein the tapered edge has a castellation shaped edge.

5. The combustor of claim 1, wherein the tapered edge has a saw tooth shaped edge.

6. The combustor of claim 1, wherein the tapered edge has an angle of inclination of substantially 45 degrees.

7. The combustor of claim 1, wherein the tapered edge is configured to reduce carbon deposit formation on an exterior surface of the dilution chute.

8. A gas turbine engine comprising:
   a compressor section;
   a combustor section in fluid communication with the compressor section, the combustor section comprising the combustor of claim 1;
   a turbine section in fluid communication with the combustor section; and
   an exhaust section in fluid communication with the turbine section.

9. The combustor of claim 1, wherein the dilution chute extends longitudinally along the longitudinal centerline into the interior of the combustor to the longitudinal peak.

10. The combustor of claim 1, wherein
    the plurality of walls further include a third wall; and
    the tapered edge further comprises a second longitudinal peak at a corner between the second wall and the third wall.

11. The combustor of claim 10, wherein
    a portion of the tapered edge extends along the second wall between the longitudinal peak and the second longitudinal peak; and
    the portion of the tapered edge is recessed longitudinally from the longitudinal peak and the second longitudinal peak towards the combustor liner.

12. The combustor of claim 11, wherein the portion of the tapered edge is castellated.

13. The combustor of claim 1, wherein the longitudinal peak comprises a triangular geometry.

14. The combustor of claim 1, wherein the dilution chute comprises metal.

15. A combustor for a gas turbine engine, the combustor comprising:
    a combustor liner; and
    a dilution chute connected to the combustor liner and including a plurality of walls;
    the plurality of walls extending longitudinally along a longitudinal centerline of the dilution chute into an interior of the combustor to a tapered edge, and the plurality of walls including a first wall and a second wall;

the tapered edge comprising a longitudinal peak at a corner between the first wall and the second wall.

16. The combustor of claim 15, wherein dilution chute is formed integral with the combustor liner.

17. The combustor of claim 15, further comprising a fuel line configured to direct fuel into the dilution chute for wetting a surface of the dilution chute.

18. The combustor of claim 15, wherein
the plurality of walls further include a third wall; and
the tapered edge further comprises a second longitudinal peak at a corner between the second wall and the third wall.

19. The combustor of claim 18, wherein
a portion of the tapered edge extends along the second wall between the longitudinal peak and the second longitudinal peak; and
the portion of the tapered edge is longitudinally setback from the longitudinal peak and the second longitudinal peak towards the combustor liner.

* * * * *